United States Patent [19]

Mori

[11] Patent Number: 5,276,521

[45] Date of Patent: Jan. 4, 1994

[54] SOLID STATE IMAGING DEVICE HAVING A CONSTANT PIXEL INTEGRATING PERIOD AND BLOOMING RESISTANCE

[75] Inventor: Kenji Mori, Tatsuno, Japan

[73] Assignee: Olympus Optical Co., Ltd., Tokyo, Japan

[21] Appl. No.: 999,665

[22] Filed: Dec. 30, 1992

Related U.S. Application Data

[63] Continuation of Ser. No. 737,085, Jul. 29, 1991, abandoned.

[30] Foreign Application Priority Data

Jul. 30, 1990 [JP] Japan .................................. 2-199323
Jul. 30, 1990 [JP] Japan .................................. 2-199324

[51] Int. Cl.$^5$ .......................... H04N 3/14; H04N 5/335
[52] U.S. Cl. ............................ 358/213.31; 358/213.15; 358/213.18
[58] Field of Search ...................... 358/213.31, 213.18, 358/213.15, 213.27, 212, 213.16

[56] References Cited

U.S. PATENT DOCUMENTS

| | | | |
|---|---|---|---|
| 4,589,027 | 5/1956 | Nakamura et al. | 358/212 |
| 4,819,071 | 4/1989 | Nakamura | 358/213.16 |
| 4,839,729 | 6/1989 | Ando et al. | 358/213.16 |
| 4,937,674 | 6/1990 | Mizoguchi et al. | 358/213.15 |

FOREIGN PATENT DOCUMENTS

63-86471  4/1988  Japan .

OTHER PUBLICATIONS

"New MOS Image Sensor Operating in a Non-Destructive Readout Mode" T. Nakamura, K. Matsumoto, R. Hyuga and A. Yusa, IEDM 86, vol. 14.2, pp. 353–356.

Electronic Letters, Dec. 8, 1988, vol. 24 No. 25, pp. 1560–1562.

*Primary Examiner*—Joseph Mancuso
*Assistant Examiner*—Wendy R. Greening
*Attorney, Agent, or Firm*—Armstrong, Westerman, Hattori, McLeland & Naughton

[57] ABSTRACT

A solid state imaging device including light receiving change Modulation Device as pixels arranged in the form of a matrix, including a horizontal scanning circuit to output video signal current, and vertical scanning circuit for sequentially selecting successive rows by applying a pixel readout driving signal to each row line-by-line. A signal is applied to the non-selected rows forming an integrating voltage during a horizontal blanking period and forming an overflow voltage during a horizontal video effective period. The pixel readout driving signal is applied to the selected row and consists of a readout voltage, followed by a reset voltage during the horizontal blanking period. A signal forming an overflow voltage during the horizontal video effective period is then applied to the selected row. The video signal currents for each column line are simultaneously stored in a storage means, which is operated to sequentially output the video signal currents simultaneously stored for each of the column lines. With this arrangement, the period of integrating time and the blooming resistance for each pixel become consistent regardless of pixel position.

3 Claims, 14 Drawing Sheets

SOLID STATE IMAGING DEVICE HAVING A CONSTANT PIXEL INTEGRATING PERIOD AND BLOOMING RESISTANCE

This application is a continuation of application Ser. No. 07/737,085 filed Jul. 29, 1991, now abandoned.

BACKGROUND OF THE INVENTION

This invention relates to a solid state imaging device and, more particularly, to a solid state imaging device in which the charge integrating time and the blooming resistance for each pixel are constant regardless of pixel positions in a light receiving area.

Recently, a solid state imaging device using light receiving elements of amplification type as pixels has been proposed. As a light receiving element of amplification type, there is known a so-called Charge Modulation Device (hereinafter abbreviated as a CMD), for example. This CMD type light receiving element is described in detail, by way of example, in a paper entitled "A NEW MOS IMAGE SENSOR OPERATING IN A NON-DESTRUCTIVE READOUT MODE", pp. 353-356, Proceedings of International Electron Device Meeting (IEDM), 1986.

One example of arrangement of such a solid state imaging device using CMD type light receiving elements as pixels is shown in FIG. 1. CMDs 51-11, 51-12, ..., 51-mn constituting respective pixels are arranged in the form of a matrix, and video voltage $V_{DD}$ (>0) is commonly applied to respective drains of the CMDs. Respective gate terminals of a group of CMDs in each row arrayed in the X-direction are commonly connected to corresponding one of row lines 52-1, 52-2, ..., 52-m, whereas respective source terminals of a group of CMDs in each column arrayed in the Y-direction are commonly connected to corresponding one of column lines 53-1, 53-2, ..., 53-n. The column lines 53-1, 53-2, ..., 53-n are commonly connected to a video line 56 through column select transistors 54-1, 54-2, ..., 54-n, respectively, and also commonly connected to a line 57, in turn grounded to GND, through non-select transistors 55-1, 55-2, ..., 55-n, respectively. The video line 56 is connected to a current-voltage conversion type preamplifier 58 with its input terminal virtually grounded, so that a video signal of negative polarity is time-serially read out at an output terminal 59 of the preamplifier 58.

Meanwhile, the row lines 52-1, 52-2, ..., 52-m are connected to a vertical scanning circuit 60 and applied with signals $\phi_{G1}$, $\phi_{G2}$, ..., $\phi_{Gm}$, respectively. Gate terminals of the column select transistors 54-1, 54-2, ..., 54-n are directly connected to a horizontal scanning circuit 61 and applied with signals $\phi_{S1}$, $\phi_{S2}$, ..., $\phi_{Sn}$, respectively. Gate terminals of the non-select transistors 55-1, 55-2, ..., 55-n are connected to the horizontal scanning circuit 61 through inverters and applied with inverted ones of the signals $\phi_{S1}$, $\phi_{S2}$, ..., $\phi_{Sn}$, respectively. The CMDs are formed on the same single substrate which is applied with voltage $V_{SUB}$ (<0).

FIG. 2 is a chart of signal waveforms for explaining operation of the solid state imaging device arranged as shown in FIG. 1. The signals $\phi_{G1}$, $\phi_{G2}$, ..., $\phi_{Gm}$ applied to the row lines 52-1, 52-2, ..., 52-m each comprise readout gate voltage $V_{RD}$, reset voltage $V_{RS}$, overflow voltage $V_{OF}$ and integrating voltage $V_{INT}$. Then, each non-selected row is applied with the overflow voltage $V_{OF}$ during a horizontal blanking period $t_{BL}$ of the video signal and with the integrating voltage $V_{INT}$ during a horizontal video effective period $t_H$ thereof, whereas each selected row is applied with the readout gate voltage $V_{RD}$ during the horizontal video effective period $t_H$ and the reset voltage $V_{RS}$ during the horizontal blanking period $t_{BL}$.

The signals $\phi_{S1}$, $\phi_{S2}$, ..., $\phi_{Sn}$ applied to the gate terminals of the column select transistors 54-1, 54-2, ..., 54-n are signals for respectively selecting the column lines 53-1, 53-2, ..., 53-n, of which voltage values are set in such a manner as to turn off the column select transistors 54-1, 54-2, ..., 54-n and on the non-select transistors 55-1, 55-2, ..., 55-n at a low level and turn on the column select transistors and off the non-select transistors at a high level.

The conventional solid state imaging device thus arranged has, however, suffered from the following problems. First, while all the pixels in the same row are simultaneously reset, the signals are read out by sequential scanning. This results in different periods of integrating time between the pixel located on the left side of the light receiving surface and the pixel located on the right side thereof. Such a difference in the integrating time causes a serious obstruction in point of providing a high-speed shutter function to the solid state imaging device.

Secondly, while the overflow operation for the purpose of improving the blooming resistance is performed at once during the horizontal blanking period, the signals are read out by sequential scanning as mentioned above. Depending upon the pixel positions on the light receiving surface, therefore, amounts of exposure made after the end of the overflow operation until the readout of signals from the pixels are different from one another. This results in different degrees of the blooming resistance depending upon the horizontal positions of the pixels.

Thirdly, in the conventional solid state imaging device arranged as mentioned above, fixed pattern noise (FPN) occurs due to fluctuations in offset currents from pixel to pixel. As means for solving this problem, there has been proposed a method whereby a component of the fixed pattern noise is stored beforehand in a storage unit externally of the solid state imaging device, and this stored noise component is subtracted from the video signal obtained through accumulation of light. But, this method has a problem of complicating the system configuration. As means for overcoming the disadvantage of the above subtraction method using the external storage unit, there is known a photoelectric conversion device as disclosed in Japanese Patent Laid-Open No. 63-86471. However, the disclosed photoelectric conversion device has another problem that it is applicable only to the case of processing a signal from each pixel as a voltage value, but not to the case of reading out the pixel signal as a current value.

SUMMARY OF THE INVENTION

The present invention has been made to solve the above problems experienced in the conventional solid state imaging device using light receiving elements of amplification type, and has for its object to provide a solid state imaging device in which the period of integrating time and the blooming resistance for each pixel are constant regardless of the pixel positions in a light receiving area.

Another object of the present invention is to provide a solid state imaging device in which the fixed pattern noise due to fluctuations in offset currents from pixel to pixel can be removed.

To achieve the above first object, a solid state imaging device according to the present invention comprises a pixel group containing light receiving elements of amplification type as pixels and prepared by arraying said pixels in the form of a matrix, a plurality of row lines each commonly connected to gates of those pixels in said pixel group which are arrayed in the X-direction for each row, a plurality of column lines each commonly connected to sources of those pixels in said pixel group which are arrayed in the Y-direction for each column, a vertical scanning circuit for sequentially applying a pixel readout signal to said row lines from line to line, video signal current storage means provided for each of said column lines to simultaneously store video signal currents of all pixels in that row line which is applied with the pixel readout signal from said vertical scanning circuit, and a horizontal scanning circuit for delivering a drive signal to sequentially output the video signal currents stored in said video signal current storage means.

In the solid state imaging device thus arranged, the storage means simultaneously stores the video signal currents for each of the column lines and are operated to sequentially output the video signal currents, resulting in that the period of integrating time and the blooming resistance are made the same for all the pixels arrayed in the form of a matrix.

Also, to achieve the first and second objects, a solid state imaging device of the present invention comprises a pixel group containing light receiving elements of amplification type as pixels and prepared by arraying said pixels in the form of a matrix, a plurality of row lines each commonly connected to gates of those pixels in said pixel group which are arrayed in the X-direction for each row, a plurality of column lines each commonly connected to sources of those pixels in said pixel group which are arrayed in the Y-direction for each column, a vertical scanning circuit for sequentially applying a drive signal, comprising a pixel readout signal, a reset signal and the readout signal, to said row lines in this order from line to line, first storage means provided for each of said column lines to simultaneously store video signal currents of all pixels in that row line which is applied with the drive signal from said vertical scanning circuit, the video signal currents being obtained in response to the readout signal before resetting, second storage means provided for each of said column lines to simultaneously store dark-state offset currents of all pixels in that row line which is applied with the drive signal from said vertical scanning circuit, the dark-state offset currents being obtained in response to the readout signal just after resetting, a horizontal scanning circuit for delivering drive signals to sequentially output the video signal currents stored in said first storage means and the dark-state offset currents stored in said second storage means separately from each other, and means for outputting differences between the video signal currents and the dark-state offset currents both being sequentially outputted.

In the solid state imaging device thus arranged, the video signal currents and the dark-state offset currents just after resetting are stored in the first and second storage means, respectively, and the thus-stored video signal currents and dark-state offset currents just after resetting are sequentially outputted in such a manner as to issue the differences therebetween. As a result, the period of integrating time and the blooming resistance are made the same for all the pixels arrayed in the form of a matrix and, in addition, a high-quality video signal free of any fixed pattern noise can be obtained.

DESCRIPTION OF EMBODIMENTS OF THE INVENTION

Figure 1:
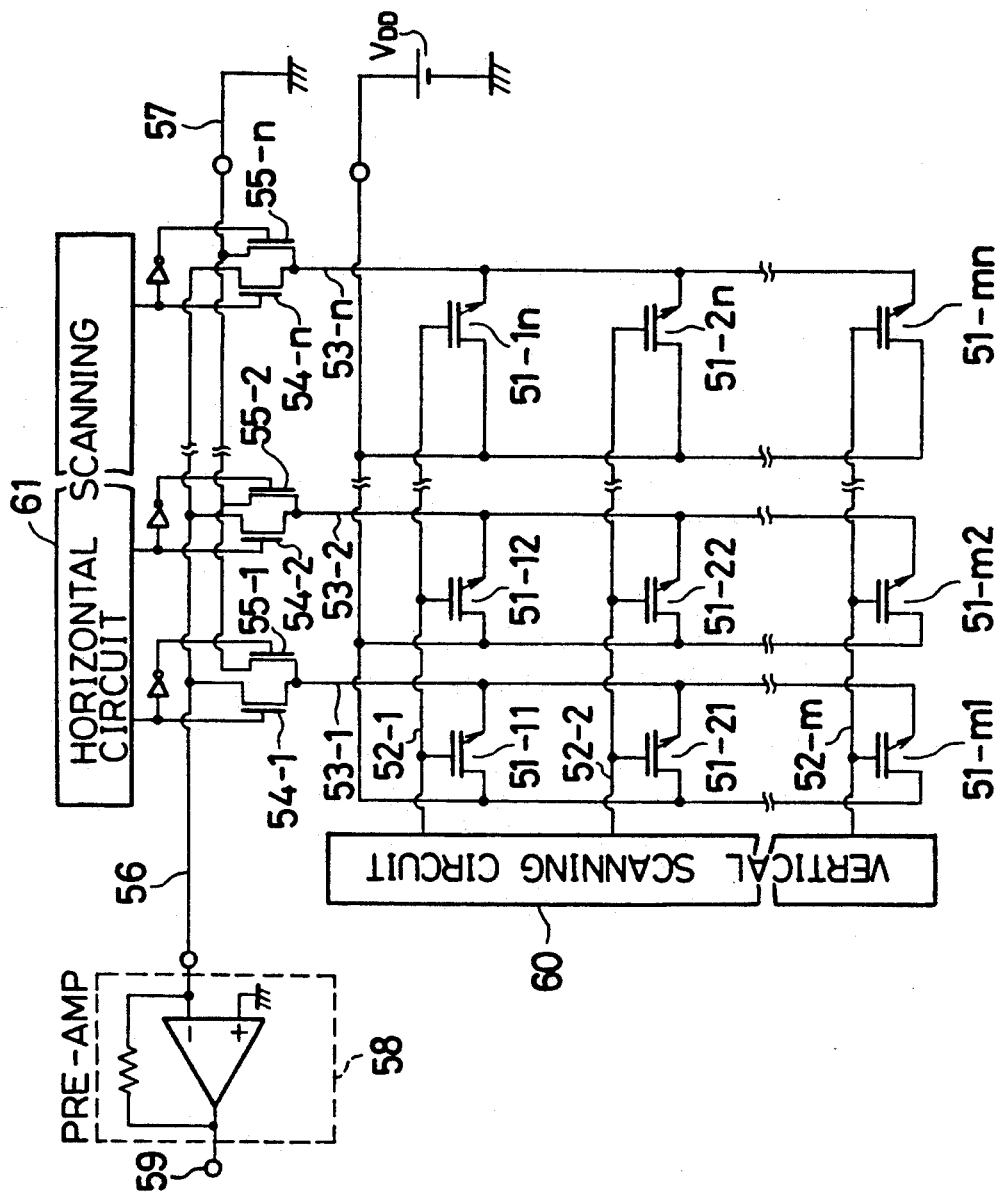
FIG. 1 is a circuit diagram showing one example of arrangement of a conventional solid state imaging device using CMDs.
Figure 2:
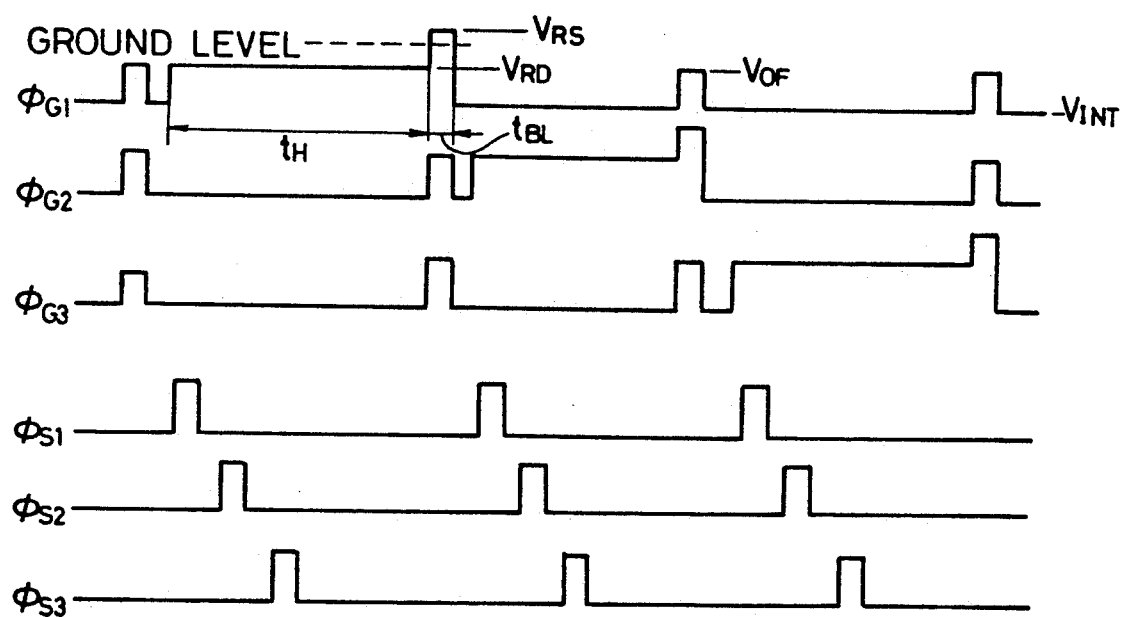
FIG. 2 is a chart of signal waveforms for explaining operation of the solid state imaging device shown in FIG. 1.
Figure 3:
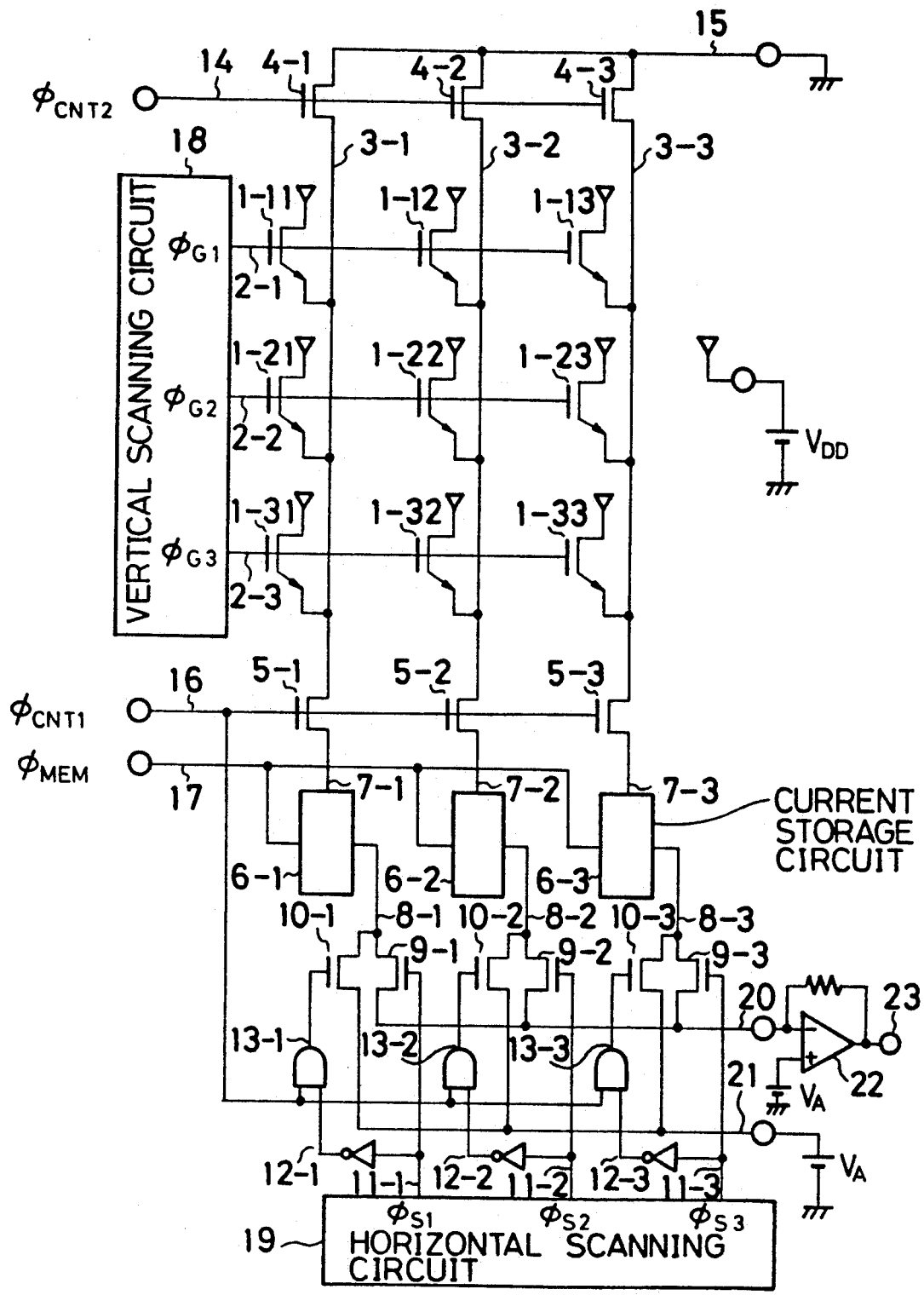
FIG. 3 is a circuit diagram showing a first embodiment of a solid state imaging device according to the present invention.

Hereinafter, embodiments of the present invention will be described with reference to the drawings. FIG. 3 is a circuit diagram showing a first embodiment of a solid state imaging device according to the present invention. For brevity of the explanation, the following embodiment illustrates a group of pixels arrayed into a matrix of three rows and three columns. CMDs 1-11, 1-12, . . . , 1-33 constituting respective pixels are arranged in the form of a matrix, and video voltage $V_{DD}(>0)$ is commonly applied to drain terminals of the CMDs. Gate terminals of a group of CMDs in each row arrayed in the X-direction are commonly connected to corresponding one of row lines 2-1, 2-2, 2-3, whereas source terminals of a group of CMDs in each column arrayed in the Y-direction are commonly connected to corresponding one of column lines 3-1, 3-2, 3-3.

The column lines 3-1, 3-2, 3-3 are commonly connected to a reset line 15, in turn grounded to GND, through reset switch transistors (N-MOS transistors) 4-1, 4-2, 4-3, respectively, and also connected to input terminals 7-1, 7-2, 7-3 of current storage circuits 6-1, 6-2, 6-3 through sample switch transistors (N-MOS transistors) 5-1, 5-2, 5-3, respectively. Gate terminals of the reset switch transistors 4-1, 4-2, 4-3 are commonly connected to a control signal line 14 and applied with a control signal $\phi_{CNT2}$, whereas gate terminals of the switch transistors 5-1, 5-2, 5-3 are commonly connected to a control signal line 16 and applied with a control signal $\phi_{CNT1}$. Further, control input terminals of the current storage circuits 6-1, 6-2, 6-3 are commonly connected to a control signal line 17 and applied with a control signal $\phi_{MEM}$.

Output terminals 8-1, 8-2, 8-3 of the current storage circuits 6-1, 6-2, 6-3 are commonly connected to a video line 20 through select transistors (N-MOS transistors) 9-1, 9-2, 9-3, respectively, and also to a non-select line 21, which is held fixed to voltage $V_A$, through non-select transistors (N-MOS transistors) 10-1, 10-2, 10-3, respectively. The video line 20 is connected to a current-voltage conversion type preamplifier 22 with its input terminal virtually connected to $V_A$, so that a video signal is time-serially read out from the preamplifier 22. The current storage circuits 6-1, 6-2, 6-3 are designed to perform the current storing and holding operation depending upon the potential of the control signal $\phi_{MEM}$ applied to the control signal line 17.

Meanwhile, the row lines 2-1, 2-2, 2-3 are connected to a vertical scanning circuit 18 and applied with signals $\phi_{G1}$, $\phi_{G2}$, $\phi_{G3}$, respectively. Gate terminals of the select transistors 9-1, 9-2, 9-3 are connected to a horizontal scanning circuit 19 through signal lines 11-1, 11-2, 11-3 and applied with signals $\phi_{S1}$, $\phi_{S2}$, $\phi_{S3}$, respectively. Further, gate terminals of the non-select transistors 10-1, 10-2, 10-3 are applied with AND outputs 13-1, 13-2, 13-3 between inverted signals 12-1, 12-2, 12-3 of the above signals $\phi_{S1}$, $\phi_{S2}$, $\phi_{S3}$ and the control signal $\phi_{CNT1}$ on the control signal line 16, respectively. The CMDs are formed on the same single substrate which is applied with voltage $V_{SUB}$ ($<0$).

Figure 4:
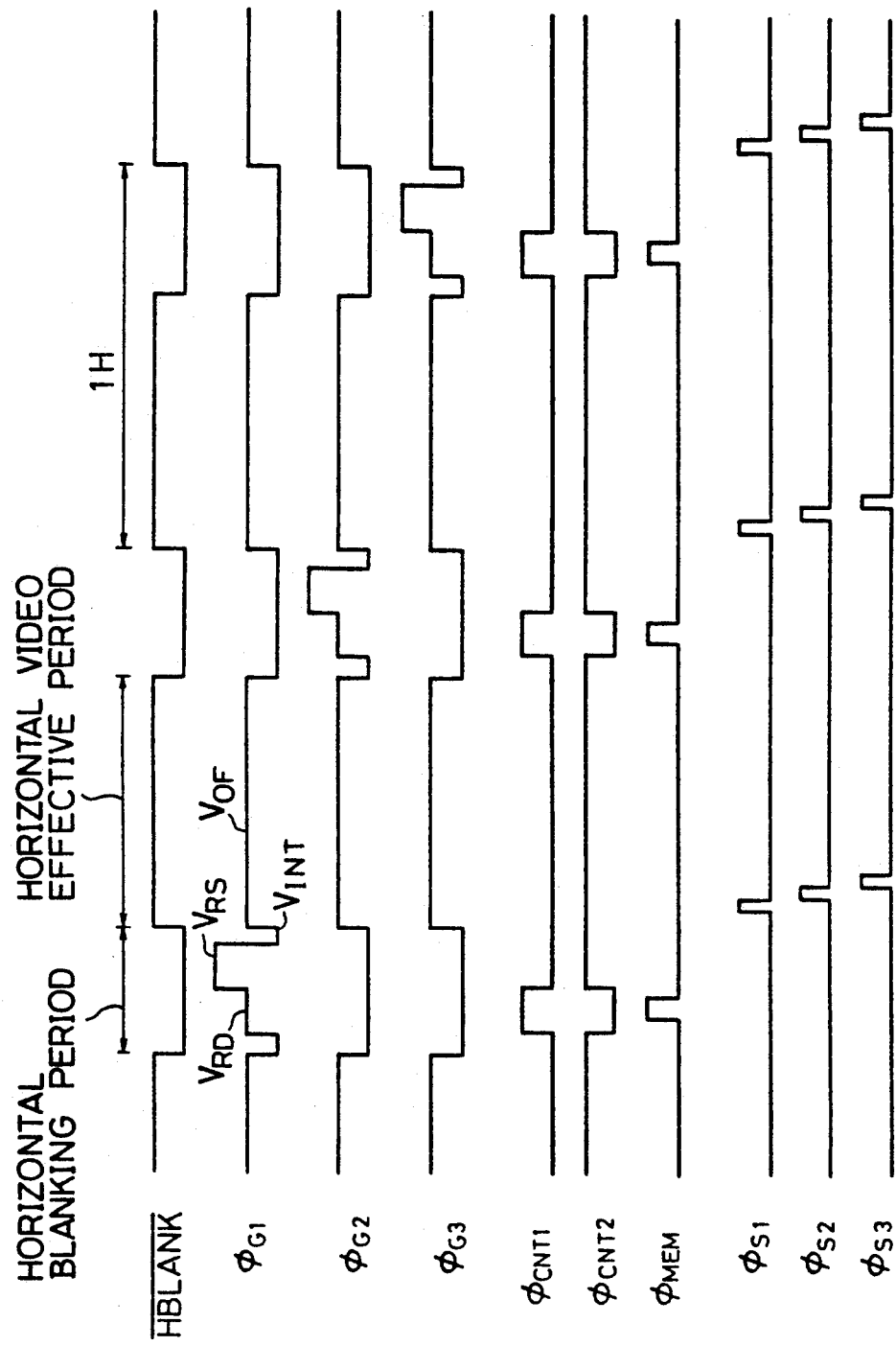
FIG. 4 is a chart of signal waveforms for explaining operation of the first embodiment shown in FIG. 3.

FIG. 4 is a timing chart for explaining operation of the solid state imaging device arranged as shown in FIG. 3. HBLANK denotes a horizontal blanking signal. The signals $\phi_{G1}$, $\phi_{G2}$, $\phi_{G3}$ applied to the row lines 2-1, 2-2, 2-3 each comprise readout voltage $V_{RD}$, reset voltage $V_{RS}$, overflow voltage $V_{OF}$ and integrating voltage $V_{INT}$. Then, each non-selected row is applied with the integrating voltage $V_{INT}$ during a horizontal blanking period and with the overflow voltage $V_{OF}$ during a horizontal video effective period. On the other hand, each selected row is applied with the readout voltage $V_{RD}$ and then the reset voltage $V_{RS}$ during the horizontal blanking period and the overflow voltage $V_{OF}$ during the horizontal video effective period.

Operation of this embodiment will be next explained. When entering a readout period in the horizontal blanking period, the control signal lines 14 ($\phi_{CNT2}$) and 16 ($\phi_{CNT1}$) respectively take a low and high level, whereupon the source terminals of the CMDs are connected to the corresponding input terminals 7-1, 7-2, 7-3 of the current storage circuits 6-1, 6-2, 6-3 through the switch transistors 5-1, 5-2, 5-3, respectively. Of the row lines, the selected row line is applied with the readout voltage $V_{RD}$ and the non-selected row lines are each applied with the integrating voltage $V_{INT}$, so that the source currents of the CMDs in the selected row line are inputted all at once to the current storage circuits 6-1, 6-2, 6-3. Then, the source currents are stored in the current storage circuits 6-1, 6-2, 6-3 upon level transition of the control signal line 17 ($\phi_{MEM}$) once to a high level and back to a low level.

Following that, the control signal lines 14 ($\phi_{CNT2}$) and 16 ($\phi_{CNT1}$) are turned to a high and low level, respectively, and the reset voltage $V_{RS}$ is applied to the selected row line, thereby simultaneously resetting the CMDs in the selected row line through the reset transistors 4-1, 4-2, 4-3 and the reset line 15. The source currents stored in the current storage circuits 6-1, 6-2, 6-3 from column line to column line are sequentially read out to the video line 20 during the subsequent horizontal video effective period in response to the control signals $\phi_{S1}$, $\phi_{S2}$, $\phi_{S3}$ from the horizontal scanning circuit 19, and then issued from the output terminal 23 of the preamplifier 22. During this readout operation, i.e., during the horizontal video effective period, the overflow voltage $V_{OF}$ is applied to each row line.

In this way, since the pixel CMDs commonly connected to each of the row lines are subjected to the reset, readout and overflow operations all at once for each operation, it is possible to obtain the same period of integrating time and the uniform blooming resistance for all the pixel CMDs, resulting in a video signal of high quality.

Figure 5:
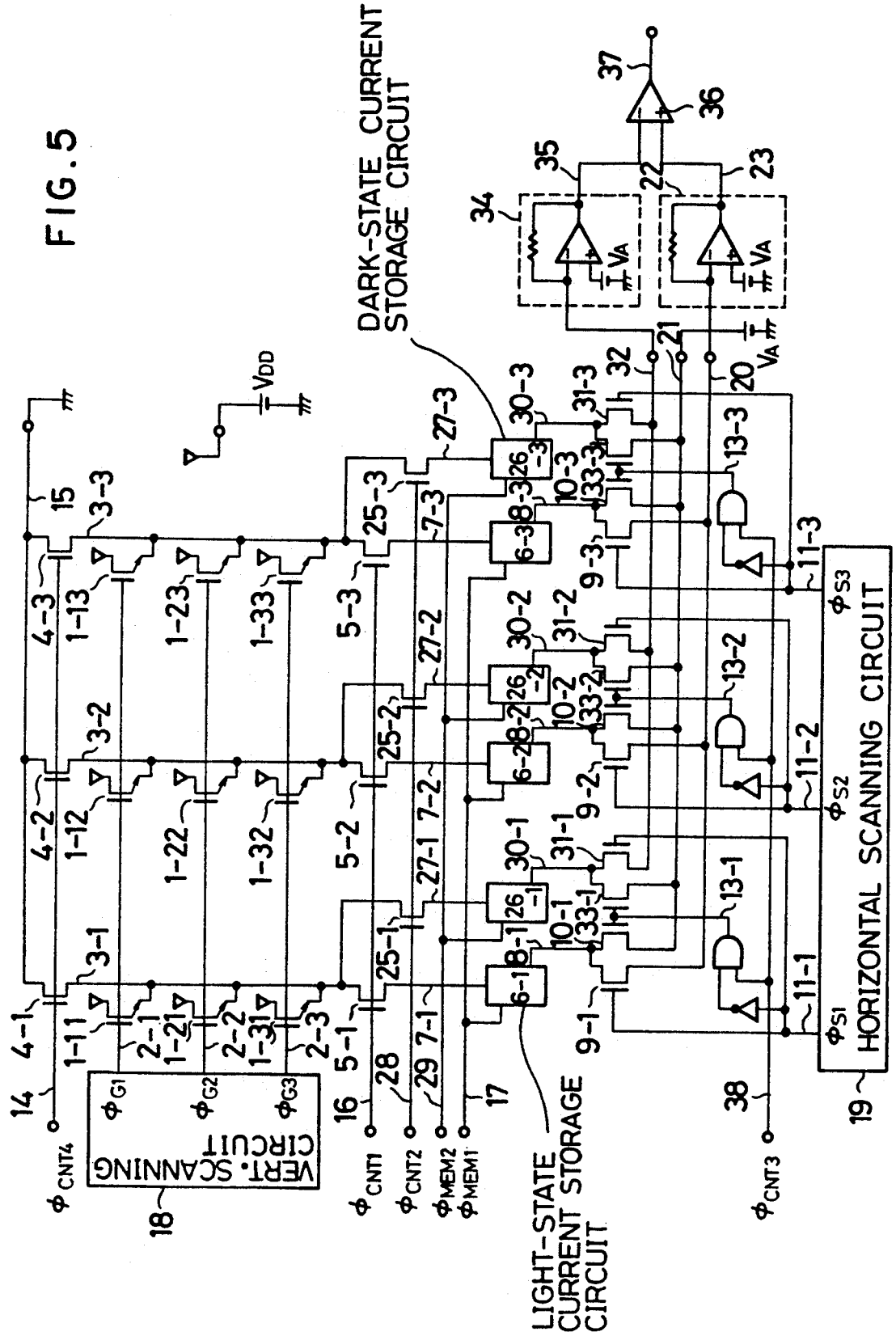
FIG. 5 is a circuit diagram showing a second embodiment of the present invention.

A second embodiment of the present invention will be described below. This embodiment is intended not only to even the period of integrating time and the blooming resistance of pixels as with the first embodiment shown in FIG. 3, but also to remove the fixed pattern noise. FIG. 5 is a circuit diagram of the second embodiment in which the same or corresponding components as or to those in the first embodiment shown in FIG. 3 are denoted by the same reference numerals. CMDs 1-11, 1-12, ..., 1-33 constituting respective pixels are arranged in the form of a matrix, and video voltage $V_{DD}$ ($>0$) is commonly applied to drain terminals of the CMDs. Gate terminals of a group of CMDs in each row arrayed in the X-direction are commonly connected to corresponding one of row lines 2-1, 2-2, 2-3, whereas source terminals of a group of CMDs in each column arrayed in the Y-direction are commonly connected to corresponding one of column lines 3-1, 3-2, 3-3.

The column lines 3-1, 3-2, 3-3 are commonly connected to a reset line 15, in turn grounded to GND, through reset switch transistors (P-MOS transistors) 4-1, 4-2, 4-3, respectively, to input terminals 7-1, 7-2, 7-3 of light-state current storage circuits 6-1, 6-2, 6-3 through light-state switch transistors (P-MOS transistors) 5-1, 5-2, 5-3, respectively, and further to input terminals 27-1, 27-2, 27-3 of dark-state current storage circuits 26-1, 26-2, 26-3 through dark-state switch transistors (P-MOS transistors) 25-1, 25-2, 25-3, respectively.

Gate terminals of the switch transistors 4-1, 4-2, 4-3; 5-1, 5-2, 5-3 and 25-1, 25-2, 25-3 are commonly connected to control signal lines 14, 16 and 28 and applied with control signals $\phi_{CNT4}$, $\phi_{CNT1}$, $\phi_{CNT2}$, respectively. Control input terminals of the light-state current storage circuits 6-1, 6-2, 6-3 are commonly connected to a control signal line 17 and applied with a control signal $\phi_{MEM1}$, whereas control input terminals of the dark-state current storage circuits 26-1, 26-2, 26-3 are commonly connected to a control signal line 29 and applied with a control signal $\phi_{MEM2}$.

Output terminals 8-1, 8-2, 8-3 of the light-state current storage circuits 6-1, 6-2, 6-3 are commonly connected to a light-state video line 20 through light-state select transistors (N-MOS transistors) 9-1, 9-2, 9-3, respectively, and also to a non-select line 21, which is held fixed to voltage $V_A$, through light-state non-select transistors (N-MOS transistors) 10-1, 10-2, 10-3, respectively. Output terminals 30-1, 30-2, 30-3 of the dark-state current storage circuits 26-1, 26-2, 26-3 are commonly connected to a dark-state video line 32 through dark-state select transistors (N-MOS transistors) 31-1, 31-2, 31-3, respectively, and also to the non-select line 21 through dark-state non-select transistors (N-MOS transistors) 33-1, 33-2, 33-3, respectively. The video lines 20, 32 are connected to current-voltage conversion type preamplifiers 22, 34 with their input terminals virtually connected to $V_A$, and output terminals 23, 35 of the preamplifiers 22, 34 are connected to input terminals of a differential amplifier 36, so that a video signal is time-serially read out from an output terminal 37 of the differential amplifier 36.

The light-state current storage circuits 6-1, 6-2, 6-3 and the dark-state current storage circuits 26-1, 26-2, 26-3 are designed to perform the current storing and holding operation depending upon the potentials of the control signals $\phi_{MEM1}$, $\phi_{MEM2}$ applied to the control signal lines 17, 29, respectively.

Meanwhile, the row lines 2-1, 2-2, 2-3 are connected to a vertical scanning circuit 18 and applied with signals $\phi_{G1}$, $\phi_{G2}$, $\phi_{G3}$, respectively. Gate terminals of the select transistors 9-1, 9-2, 9-3 and 31-1, 31-2, 31-3 are connected to a horizontal scanning circuit 19 through signal lines 11-1, 11-2, 11-3 and applied with scan signals $\phi_{S1}$, $\phi_{S2}$, $\phi_{S3}$, respectively. Further, gate terminals of the non-select transistors 10-1, 10-2, 10-3 and 33-1, 33-2, 33-3 are applied with AND outputs 13-1, 13-2, 13-3 between inverted signals of the above scan signals $\phi_{S1}$, $\phi_{S2}$, $\phi_{S3}$ and a control signal $\phi_{CNT3}$ from a control signal line 36, respectively. The CMDs are formed on the same single substrate which is applied with voltage $V_{SUB}$ ($<0$).

Figure 6:
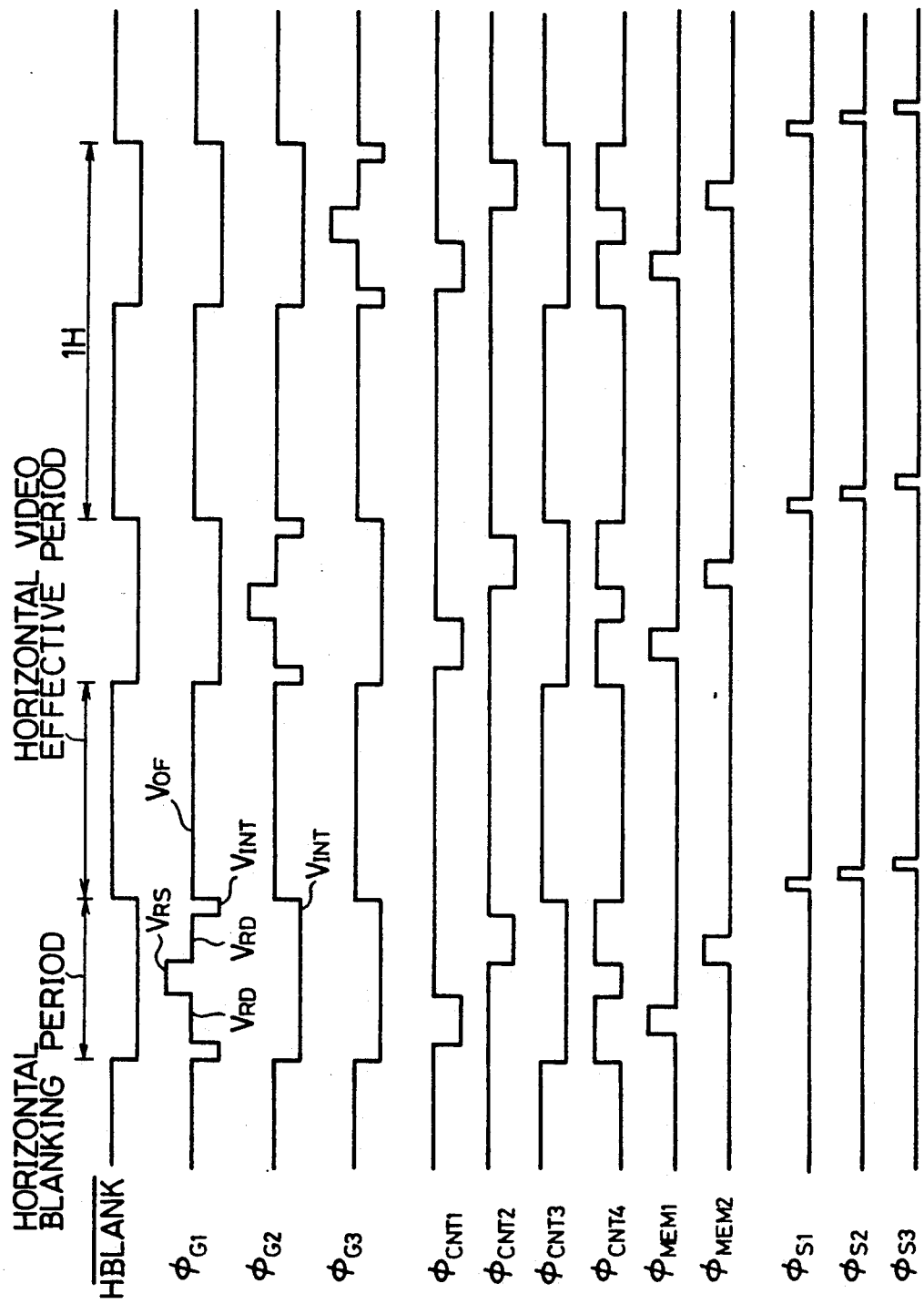
FIG. 6 is a chart of signal waveforms for explaining operation of the second embodiment shown in FIG. 5.

FIG. 6 is a timing chart for explaining operation of the second embodiment arranged as shown in FIG. 5. HBLANK denotes a horizontal blanking signal. The signals $\phi_{G1}$, $\phi_{G2}$, $\phi_{G3}$ applied to the row lines 2-1, 2-2, 2-3 each comprise readout voltage $V_{RD}$, reset voltage $V_{RS}$, overflow voltage $V_{OF}$ and integrating voltage $V_{INT}$. Then, each non-selected row is applied with the integrating voltage $V_{INT}$ during a horizontal blanking period and with the overflow voltage $V_{OF}$ during a horizontal video effective period. On the other hand, each selected row is applied with the potentials of $V_{RD} \rightarrow V_{RS} \rightarrow V_{RD}$ in this order during the horizontal blanking period and the overflow voltage $V_{OF}$ during the horizontal video effective period.

Operation of this embodiment will be next explained. When entering a readout period in the horizontal blanking period, the control signal lines 14 ($\phi_{CNT4}$) and 28 ($\phi_{CNT2}$) both take a high level and the control signal line 16 ($\phi_{CNT1}$) takes a low level, whereupon the source terminals of the CMDs are connected to the corresponding input terminals 7-1, 7-2, 7-3 of the light-state current storage circuits 6-1, 6-2, 6-3 through the light-state switch transistors 5-1, 5-2, 5-3, respectively. Of the row lines, the selected row line is applied with the readout voltage $V_{RD}$ and the non-selected row lines are each applied with the integrating voltage $V_{INT}$, so that the source currents of the CMDs in the selected row line are inputted all at once to the light-state current storage circuits 6-1, 6-2, 6-3. Then, the light-state source currents are stored in the light-state current storage circuits 6-1, 6-2, 6-3 upon level transition of the control signal line 17 ($\phi_{MEM1}$) once to a high level and back to a low level.

Following that, the control signal line 14 ($\phi_{CNT4}$) is turned to a low level and the control signal line 16 ($\phi_{CNT1}$) is turned to a high level, thereby connecting the column lines 3-1, 3-2, 3-3 to GND through the reset transistors 4-1, 4-2, 4-3, respectively. Then, the reset voltage $V_{RS}$ is applied to the selected row line for simultaneously resetting the pixels in the selected row line. Thereafter, under a condition that the selected row line is applied with the readout $V_{RD}$, the control signal line 14 ($\phi_{CNT4}$) is turned to a high level and the control signal line 28 ($\phi_{CNT2}$) is turned to a low level, whereupon the source terminals of the CMDs are connected to the corresponding input terminals 27-1, 27-2, 27-3 of the dark-state current storage circuits 26-1, 26-2, 26-3 through the dark-state switch transistors 25-1, 25-2, 25-3, respectively. The dark-state source currents corresponding to offsets in a dark state are stored in the dark-state current storage circuits 26-1, 26-2, 26-3 upon level transition of the control signal line 29 ($\phi_{MEM2}$) once to a high level and back to a low level. The video signal currents (light-state source currents) and the dark-state offset currents (dark-state source currents), both stored from column line to column line, are sequentially read out to the video lines 20 and 32 during the subsequent horizontal video effective period in response to the control signals $\phi_{S1}$, $\phi_{S2}$, $\phi_{S3}$ from the horizontal scanning circuit 19. During this readout operation, the overflow voltage $V_{OF}$ is applied to each row line. In addition, the control signal line 38 ($\phi_{CNT3}$) assumes a low level during the horizontal blanking period and a high level during the horizontal video effective period.

Subsequently, the video signal current and the dark-state offset current read out to the video lines 20, 32 are subjected to current-voltage conversion by the preamplifiers 22, 34, respectively, and then differentially amplified by the differential amplifier 36 so that a video signal free of the fixed pattern noise is obtained from the output terminal 37.

Figure 7:
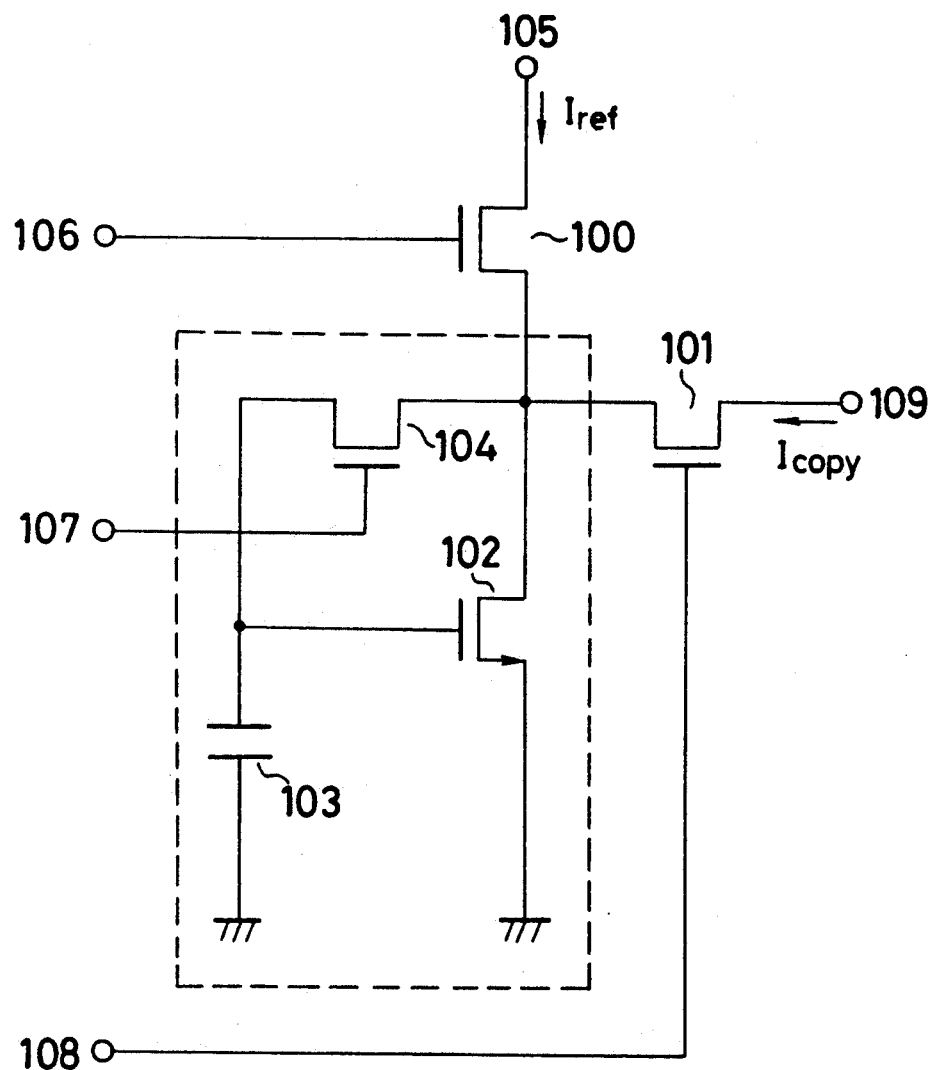
FIG. 7 is a diagram showing one example of arrangement of a current storage circuit in FIGS. 3 and 5.

Next, FIG. 7 shows one example of arrangement of each current storage circuit used in the first and second embodiments. This circuit is reported by S. J. DAUBERT, et. al. in the paper entitled "CURRENT COPIER CELLS", Vol. 24, No. 25, pp. 1560–1562, ELECTRONICS LETTERS, 8th December, 1988. In the drawing, a circuit surrounded by broken lines corresponds to each of the current storage circuits 6-1, 6-2, 6-3 or 26-1, 26-2. 26-3 in FIGS. 3 and 5, a switch transistor 100 corresponds to each of the switch transistors 5-1, 5-2, 5-3 or 25-1, 25-2. 25-3 in FIGS. 3 and 5, and further a switch transistor 101 corresponds to each of the switch transistors 9-1, 9-2, 9-3 or 31-1, 31-2. 31-3 in FIGS. 3 and 5, respectively. A gate input signal line 107 of a switch transistor 104 corresponds to the control signal line 17 or 29 in FIGS. 3 and 5.

Operation of this current storage circuit will now be explained. First, the switch transistors 100 and 104 are turned on and the switch transistor 101 is turned off, whereby a current $I_{ref}$ to be stored flows into the circuit from an input terminal 105. At this time, a potential corresponding to the current $I_{ref}$ appears at a gate terminal of a MOS transistor 102 to charge a capacitor 103. By turning off the switch transistor 104 under this condition, the gate potential of the MOS transistor 102 is held fixed at such a potential as allowing the current $I_{ref}$ to flow in thereto. Accordingly, when the switch transistor 100 is turned off and the switch transistor 101 is turned on after that, a current $I_{copy}$ equal to the current $I_{ref}$ can be sucked from an output terminal 109 through the switch transistor 101.

Figure 8:
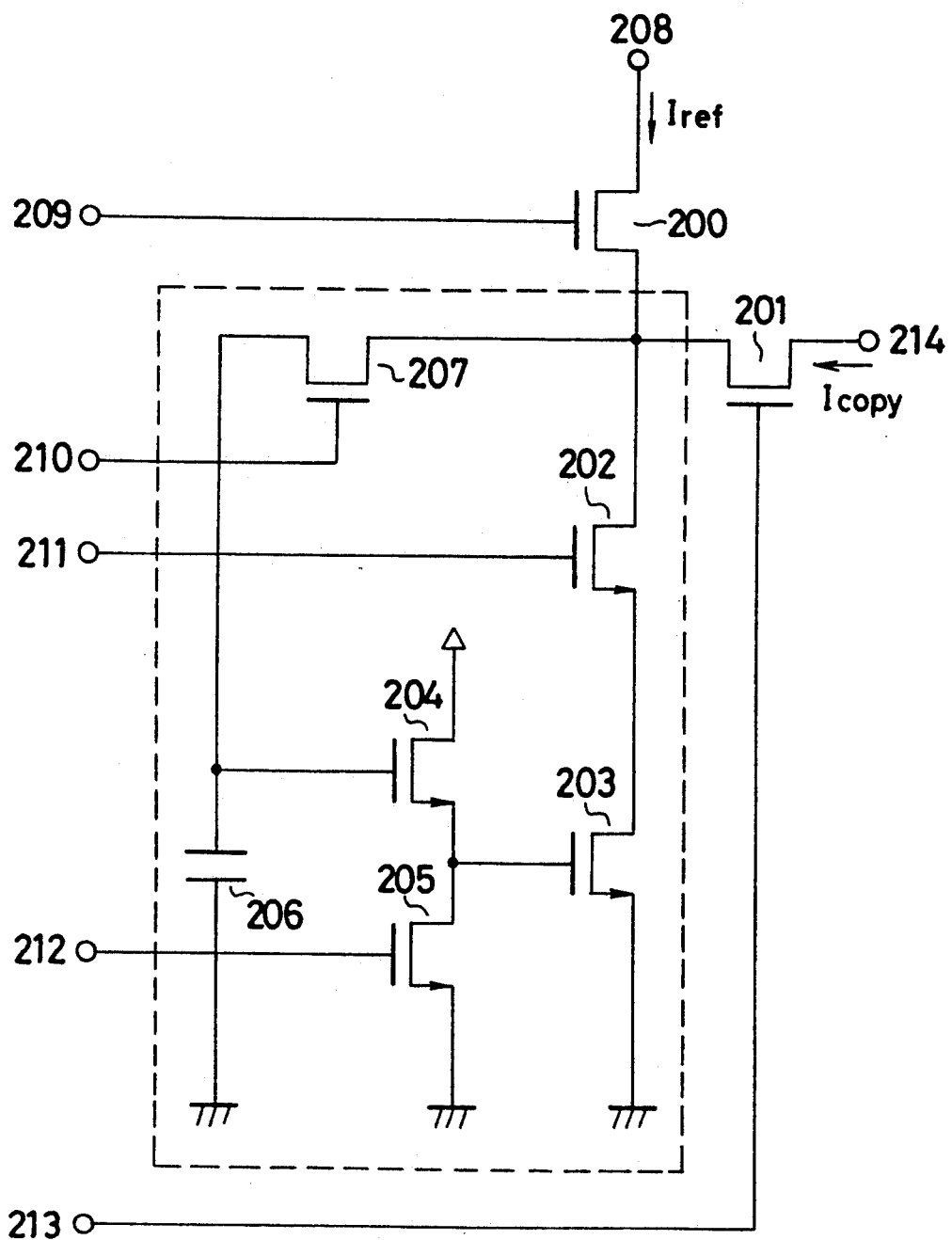
FIGS. 8 to 12 are diagrams showing other different arrangements of the current storage circuit.

FIG. 8 is a diagram showing another example of arrangement of the current storage circuit. This circuit is intended to suppress an error due to modulation of a channel length in the current storage circuit shown in FIG. 7. In the diagram, a circuit surrounded by broken lines corresponds to each of the current storage circuits 6-1, 6-2, 6-3 or 26-1, 26-2. 26-3 in FIGS. 3 and 5, a switch transistor 200 corresponds to each of the switch transistors 5-1, 5-2, 5-3 or 25-1, 25-2. 25-3 in FIGS. 3 and 5, and further a switch transistor 201 corresponds to each of the switch transistors 9-1, 9-2, 9-3 or 31-1, 31-2.

31-3 in FIGS. 3 and 5, respectively. A gate input signal line 210 of a switch transistor 207 corresponds to the control signal line 17 or 29 in FIGS. 3 and 5.

A transistor 202 has a function of suppressing changes in the drain potential of a transistor 203 caused by changes in the current $I_{ref}$ to be stored. Transistors 204 and 205 serve to shift the gate potential of the transistor 203 so that the transistors 202 and 203 may operate within a saturation region. In addition, proper DC biases are applied to gate input terminals 211 and 212.

Figure 9:
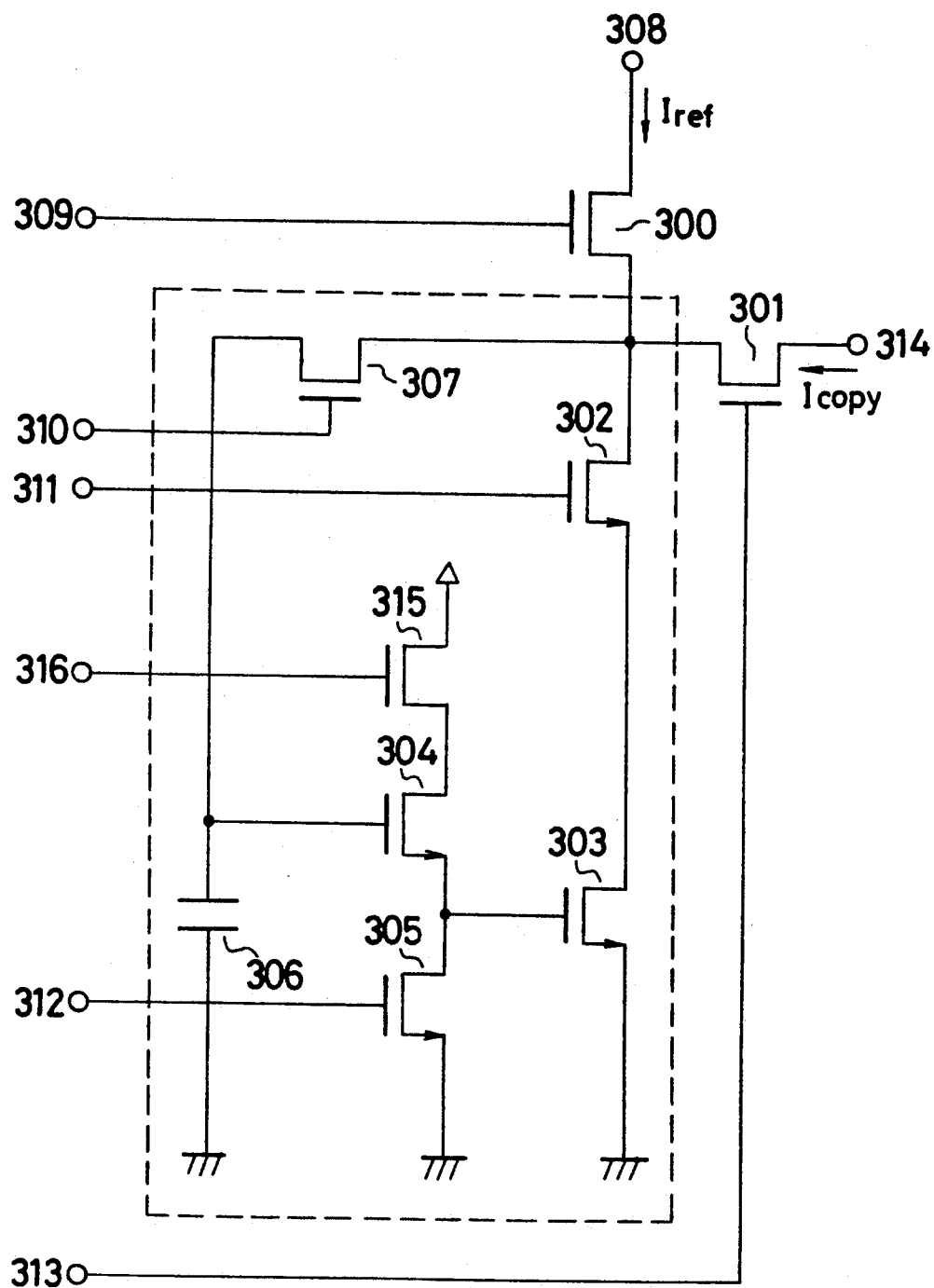

FIG. 9 is a diagram showing still another example of arrangement of the current storage circuit which is intended to suppress power consumption in the current storage circuit shown in FIG. 8. Specifically, in this current storage circuit, a switch transistor 315 is provided in series to transistors 304 and 305, which constitute a level shift circuit, for operating the level shift circuit only when required. This is effected by driving the gate input terminal 316 by the application of pulses so as to turn on and off the switch transistor 315.

Figure 10:
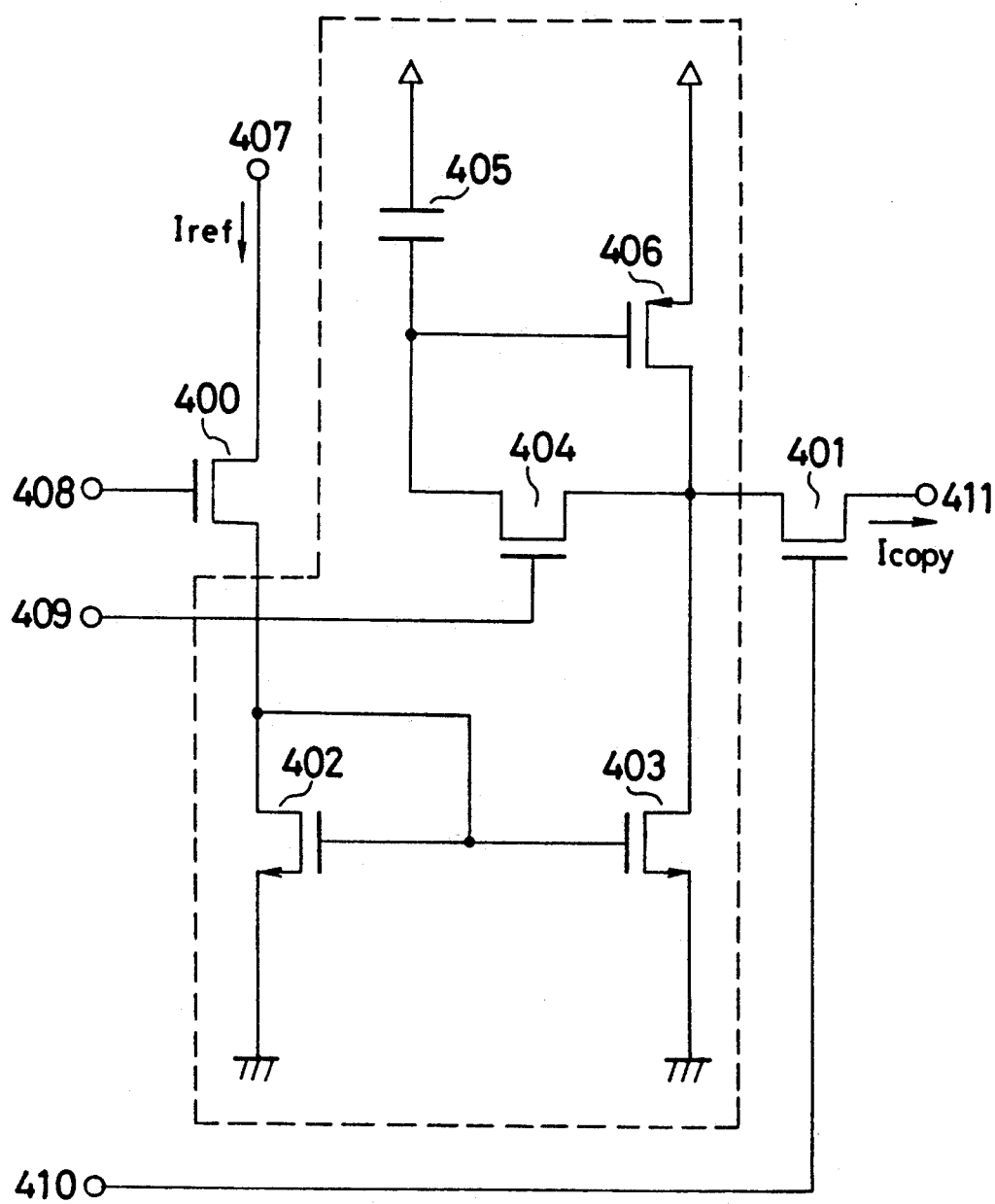

FIG. 10 shows an example arranged to invert the polarity of the output current $I_{copy}$ from the current storage circuit shown in FIG. 7. In this example, a circuit surrounded by broken lines corresponds to each of the current storage circuits 6-1, 6-2, 6-3 or 26-1, 26-2, 26-3 in FIGS. 3 and 5, a switch transistor 400 corresponds to each of the switch transistors 5-1, 5-2, 5-3 or 25-1, 25-2. 25-3 in FIGS. 3 and 5, and further a switch transistor 401 corresponds to each of the switch transistors 9-1, 9-2, 9-3 or 31-1, 31-2. 31-3 in FIGS. 3 and 5, respectively.

To describe operation, first, the switch transistors 400 and 404 are turned on and the switch transistor 401 is turned off, whereby a current $I_{ref}$ to be stored flows into the circuit. Transistors 402 and 403 constitute a current mirror circuit so that a current equal to the current $I_{ref}$ is pulled in from a power supply through a transistor 406. By turning off the switch transistor 404 under this condition, the gate potential of the transistor 406 is held fixed at such a potential as allowing the current $I_{ref}$ to flow. Accordingly, when the switch transistor 400 is turned off and the switch transistor 401 is turned on after that, a current $I_{copy}$ equal to the current $I_{ref}$ can be flowed out from an output terminal 411 through the switch transistor 401.

Figure 11:
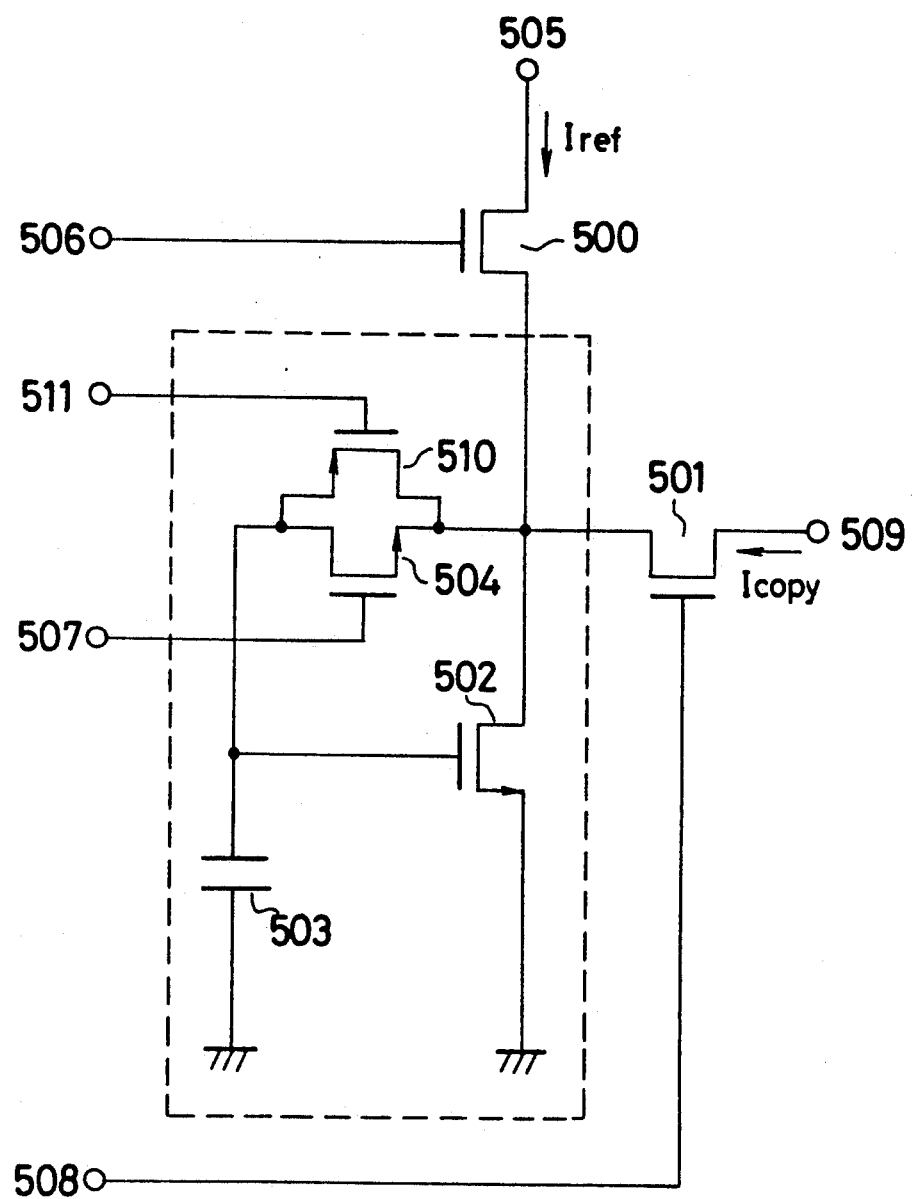
Figure 12:
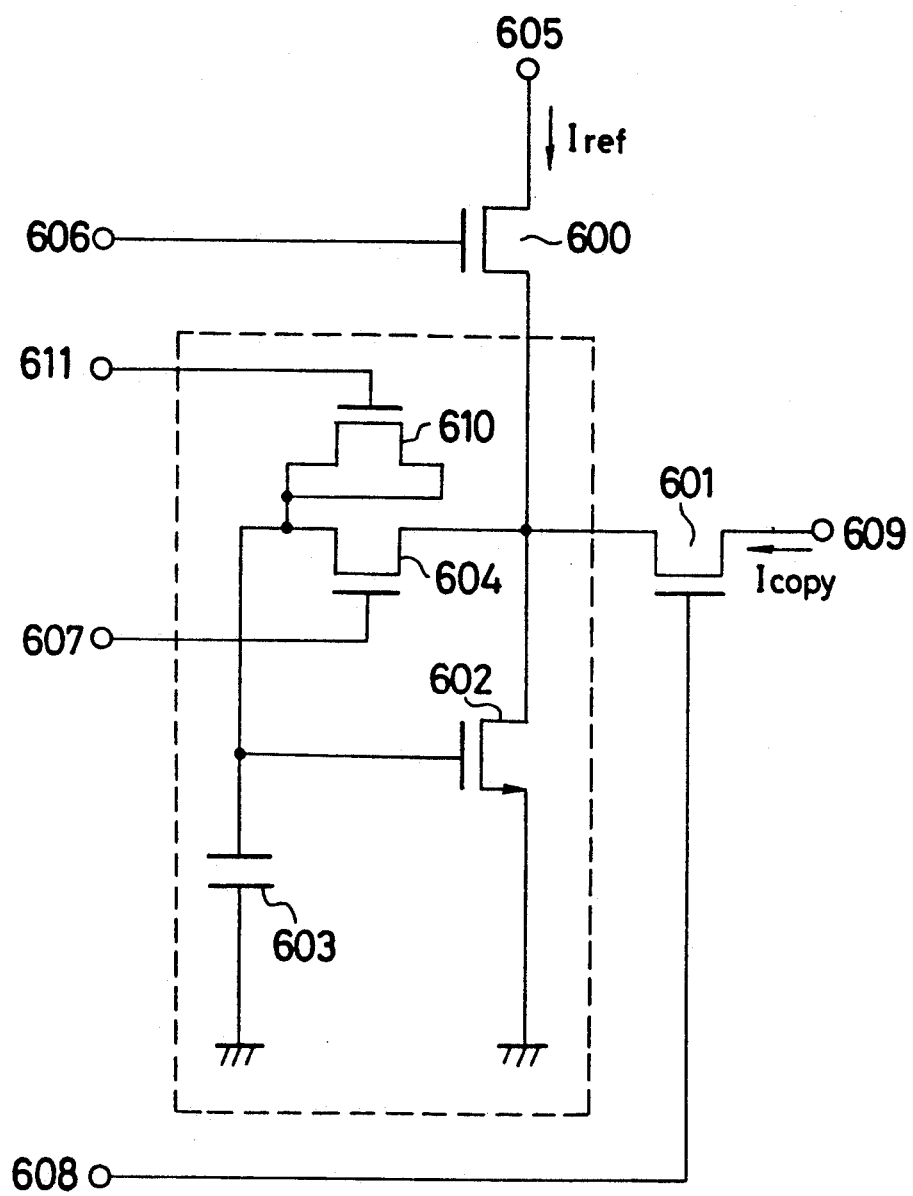

FIGS. 11 and 12 show examples arranged to alleviate an influence of potential changes (field through) in the capacitor 103 which is caused upon switching of the transistor 104 in the current storage circuit shown in FIG. 7. The above influence can be alleviated by driving transistors 504, 510 in FIG. 11 and transistors 604, 610 in FIG. 12 by application of pulses with opposite phases, repsectively.

Figure 13:
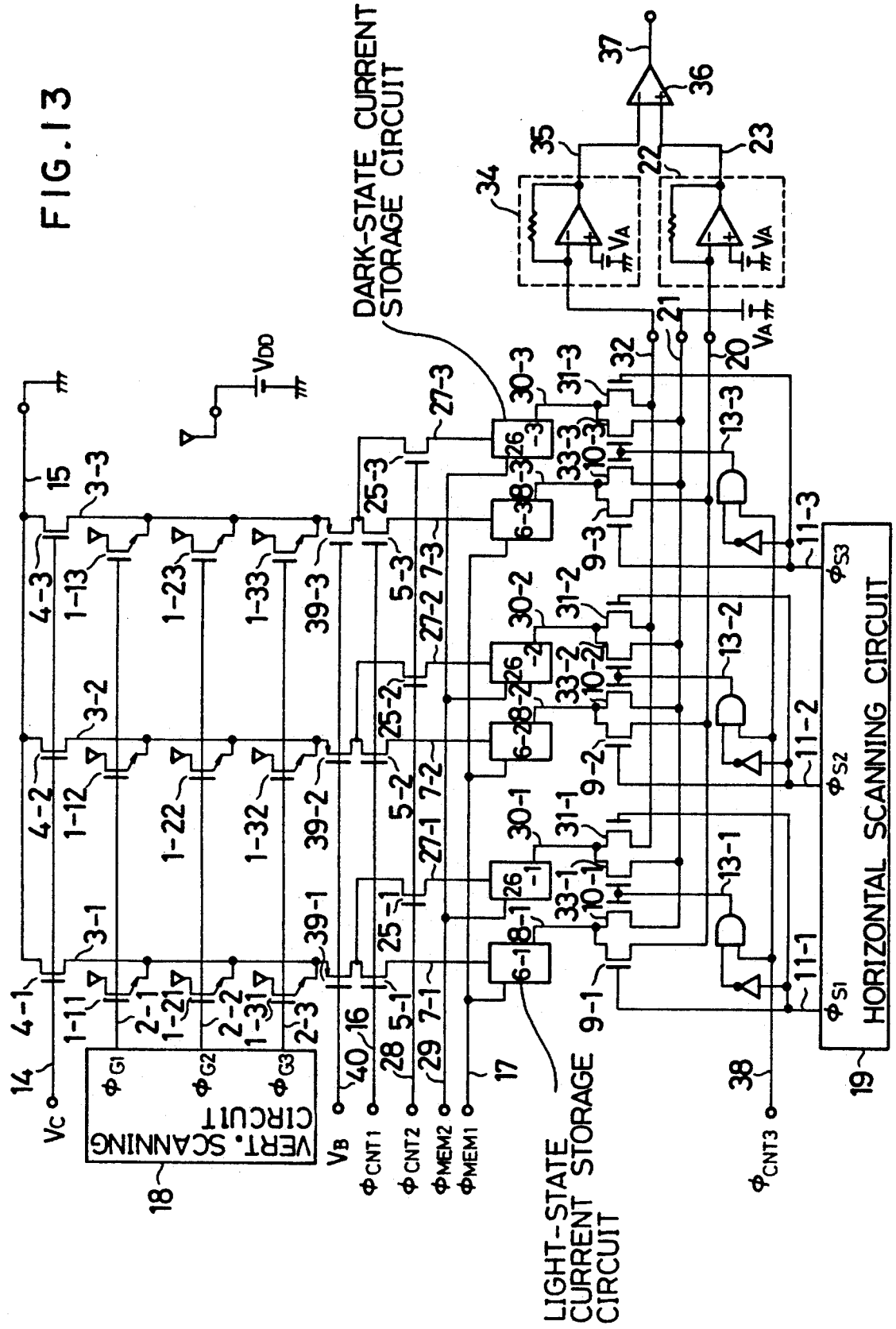
FIG. 13 is a circuit diagram showing a third embodiment of the present invention.

FIG. 13 is a circuit diagram of a third embodiment which is arranged to permit the source potential of each CMD to be optionally set in the second embodiment shown in FIG. 5. The circuit arrangement of this embodiment is different from that of the second embodiment in that source potential fixing transistors 39-1, 39-2 and 39-3 are provided in series between the column line 3-1 and the switch transistors 5-1, 25-1, between the column line 3-2 and the switch transistors 5-2, 25-2, and further between the column line 3—3 and the switch transistors 5-3, 25-3, respectively. Common voltage $V_B$ is applied to gate terminals of source potential fixing transistors 39-1, 39-2, 39-3 through a potential supply line 40 to thereby set the source potential depending on a value of the voltage $V_B$. This embodiment also shows another modified arrangement that in place of driving the control signal line 14 by the application of the pulse $\phi_{CNT4}$ in the second embodiment shown in FIG. 5, the control signal line is fixed to such a potential $V_C$ as allowing the switch transistors 4-1, 4-2, 4-3 to start turning on upon a potential rise of the column lines 3-1, 3-2, 3-3 during the reset and overflow operations.

Figure 14:
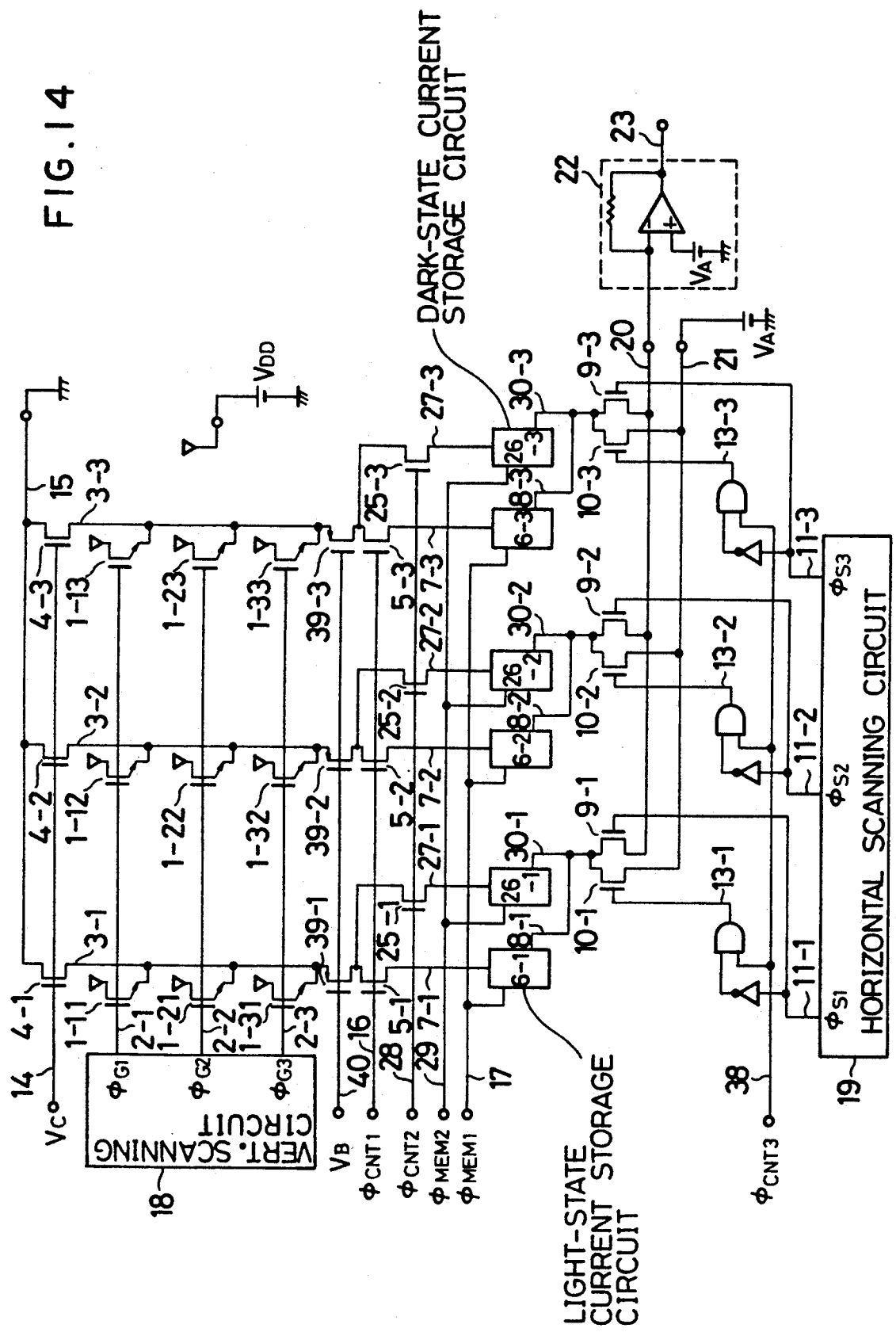
FIG. 14 is a circuit diagram showing a fourth embodiment of the present invention.

FIG. 14 is a circuit diagram showing a fourth embodiment. In this embodiment, one of the paired current storage circuits in the third embodiment shown in FIG. 13 is arranged as shown in FIG. 7 and the other current storage circuit is arranged as shown in FIG. 10, so that the dark-state offset current is subtracted from the video signal current within the solid state image sensor. More specifically, in the embodiment of FIG. 14, the circuit arranged as shown in FIG. 7 is used as each of the light-state current storage circuits 6-1, 6-2, 6-3, whereas the circuit arranged as shown in FIG. 10 is used as each of the dark-state current storage circuits 26-1, 26-2, 26-3, whereby a video signal current free of the dark-state offset current is outputted to the video line 20.

Although CMDs are employed as pixels in the above embodiments, the present invention is also applicable to a solid state imaging device which employs Static Induction Transistors (abbreviated as SIT) as pixels.

According to the present invention, as described above by referring to several embodiments, since there is provided means which simultaneously store video signal currents for each of column lines and are operated to sequentially output the stored video signal currents from column line to column line, the period of integrating time and the blooming resistance for each pixel are constant regardless of pixel positions in a light receiving area. Furthermore, according to the present invention, since there is provided means which simultaneously store the video signal currents and dark-state offset currents just after resetting are stored in the first and second storage means for each of the row lines, and the video signal currents and the dark-state offset currents both stored in the storage means are sequentially outputted in such a manner as to issue the differences therebetween, a high-quality video signal free of any fixed pattern noise can be obtained.

What is claimed is:

1. A solid state imaging device comprising:
    a pixel group containing Charge Modulation Devices as pixels and prepared by arraying said pixels in the form of a matrix, wherein each said Charge Modulation Device includes gate, source, and drain terminals,
    a plurality of row lines each commonly connected to respective gate terminals of those pixels in said pixel group which are arrayed in the X-direction for each row,
    a plurality of column lines each commonly connected to respective source terminals of those pixels in said pixel group which are arrayed in the Y-direction for each column,
    a vertical scanning circuit for sequentially selecting successive rows of said row lines by applying a pixel readout driving signal to said row lines from line-to-line wherein a signal is applied to non-selected rows of said row lines which forms an integrating voltage during a horizontal blanking period and which forms an overflow voltage during a horizontal video effective period, said vertical scanning circuit also applying to each selected row said pixel readout driving signal consisting of a readout voltage followed by a reset voltage during the horizontal blanking period and also a signal forming an overflow voltage during the horizontal video effective period, video signal current storage means provided for each of said column lines to simultaneously store video signal currents of all pixels in that row line which is applied with said pixel readout driving signal from said vertical scanning circuit to provide a constant pixel integrating period and a constant blooming resistance, and a horizontal scanning circuit for delivering a drive signal to sequentially output the video signal currents stored in said video current storage means.

2. A solid state imaging device comprising:

a pixel group containing Charge Modulation Devices as pixels and prepared by arraying said pixels in the form of a matrix, wherein each said Charge Modulation Device includes gate, source, and drain terminals, a plurality of row lines each commonly connected to respective gate terminals of those pixels in said pixel group which are arrayed in the X-direction for each row, a plurality of column lines each commonly connected to respective source terminals of those pixels in said pixel group which are arrayed in the Y-direction for each column, a vertical scanning circuit for sequentially selecting successive rows of said row lines by applying a pixel readout driving signal to said row lines from line-to-line, wherein a signal is applied to non-selected rows of said row lines which forms an integrating voltage during a horizontal blanking period and which forms an overflow voltage during a horizontal video effective period, said vertical scanning circuit also applying to each selected row said pixel readout driving signal consisting of a first readout voltage, a reset voltage and a second readout voltage during the horizontal blanking period and also a signal forming an overflow voltage during the horizontal video effective period, first storage means provided for each of said column lines to simultaneously store video signal currents of all pixels in that row line which is applied with said pixel readout driving signal from said vertical scanning circuit to provide a constant pixel integrating period and a constant blooming resistance, the video signal currents being obtained in response to said first readout voltage before resetting, second storage means provided for each of said column lines to simultaneously store dark-site offset currents of all pixels in that row line which is applied with said pixel readout driving signal from said vertical scanning circuit, the dark-state offset currents being obtained in response to said second readout voltage just after resetting, a horizontal scanning circuit for delivering drive signals to sequentially output the video signal currents stored in said first storage means and the dark-state offset currents stored in said second storage means separately from each other, and means for outputting differences between the video signal currents and the dark-state offset currents both being sequentially outputted.

3. A solid state imaging device comprising:

a pixel group containing Charge Modulation Devices as pixels and prepared by arraying said pixels in the form of a matrix, wherein each said Charge Modulation Device includes gate, source and drain terminals, a plurality of row lines each commonly connected to respective gate terminals of those pixels in said pixel group which are arrayed in the X-direction for each row, a plurality of column lines each commonly connected to respective source terminals of those pixels in said pixel group which are arrayed in the Y-direction for each column, a vertical scanning circuit for sequentially selecting successive rows of said row lines by applying a pixel readout driving signal to said row lines from line-to-line, wherein a signal is applied to non-selected rows of said row lines which forms an integrating voltage during a horizontal blanking period and which forms an overflow voltage during a horizontal video effective period, said vertical scanning circuit also applying to each selected row said pixel readout driving signal consisting of a first readout voltage, a reset voltage and a second readout voltage during the horizontal blanking period and also a signal forming an overflow voltage during the horizontal video effective period, first storage means provided for each of said column lines to simultaneously store video signal currents of all pixels in that row line which is applied with said pixel readout driving signal from said vertical scanning circuit to provide a constant pixel integrating period and a constant blooming resistance, the video signal currents being obtained in response to said first readout voltage before resetting, second storage means having a polarity opposite to the polarity of said first storage means and provided for each of said column lines to simultaneously store dark-state offset currents of all pixels in that row line which is applied with said pixel readout driving signal from said vertical scanning circuit, the dark-state offset currents being obtained in response to said second readout voltage just after resetting, and a horizontal scanning circuit for delivering drive signals to sequentially output differential currents between the video signal currents stored in said first storage means and the dark-state offset currents stored in said second storage means.

* * * * *